United States Patent
Palm et al.

(10) Patent No.: US 7,311,817 B2
(45) Date of Patent: Dec. 25, 2007

(54) SYSTEM AND METHOD FOR SANITIZING AND REFILLING A POTABLE WATER SYSTEM ONBOARD A TRANSPORT VEHICLE

(75) Inventors: Joseph M. Palm, Lombard, IL (US); Loren H. Semler, Franklin Park, IL (US); William E. Schulz, Palatine, IL (US)

(73) Assignee: Semler Industries, Inc., Franklin Park, IL (US)

( * ) Notice: Subject to any disclaimer, the term of this patent is extended or adjusted under 35 U.S.C. 154(b) by 386 days.

(21) Appl. No.: 10/988,755

(22) Filed: Nov. 15, 2004

(65) Prior Publication Data

US 2005/0103725 A1    May 19, 2005

Related U.S. Application Data

(60) Provisional application No. 60/520,124, filed on Nov. 14, 2003.

(51) Int. Cl.
*C02F 1/78* (2006.01)

(52) U.S. Cl. .............. 210/96.1; 210/138; 210/171; 210/192; 210/203; 210/205; 210/241; 210/416.3

(58) Field of Classification Search ............. 210/96.1, 210/138, 171, 192, 203, 205, 241, 416.3, 210/760; 422/3, 29
See application file for complete search history.

(56) References Cited

U.S. PATENT DOCUMENTS

2004/0050798 A1* 3/2004 Schulz et al. .............. 210/760
2005/0103726 A1* 5/2005 Palm et al. ................ 210/760

* cited by examiner

*Primary Examiner*—Matthew O. Savage
(74) *Attorney, Agent, or Firm*—Marshall, Gerstein & Borun LLP

(57) ABSTRACT

A system for sanitizing and refilling a potable water system onboard a transport vehicle includes a potable water supply conduit, a potable water feed conduit, a potable water return conduit, a drain conduit, and a sanitizing and refilling station wherein the system is operable in a self-flush mode, a sanitizing mode using ozone, and a fill mode. A method of sanitizing and refilling a potable water system onboard a transport vehicle includes the steps of purging stagnant water from a sanitizing and refilling station, draining stagnant water from the transport's potable water system, sanitizing the transport's potable water system using ozone, draining the transport's potable water system, and filling the transport's potable water system by delivering fresh water.

19 Claims, 3 Drawing Sheets

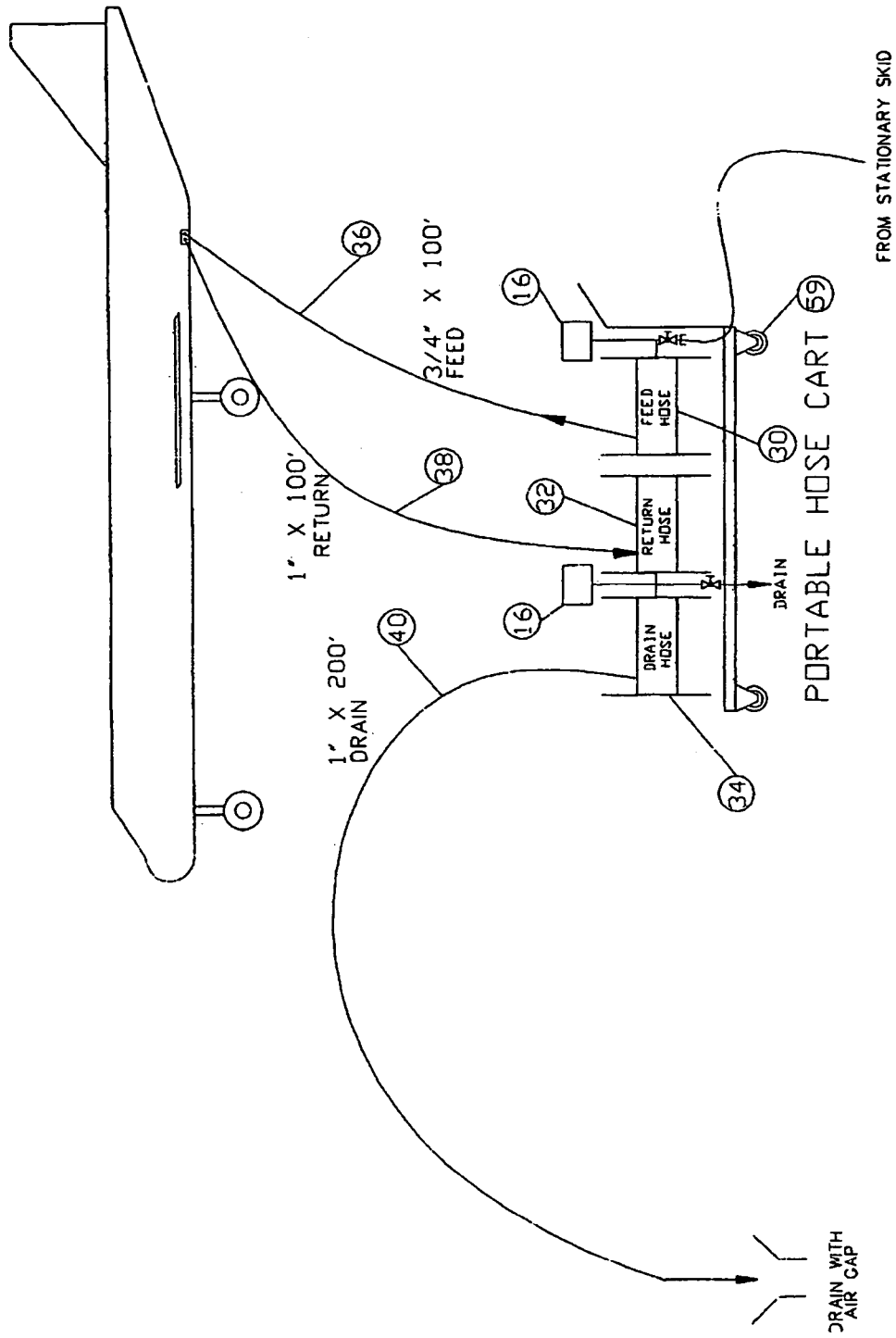

SYSTEM AND METHOD FOR SANITIZING AND REFILLING A POTABLE WATER SYSTEM ONBOARD A TRANSPORT VEHICLE

RELATED APPLICATION DATA

This application claims priority to now abandoned U.S. provisional application Ser. No. 60/520,124 filed on Nov. 14, 2003

FIELD OF THE INVENTION

The present invention is generally directed to ensuring against contaminants in potable drinking water and, more particularly, to a system and method for sanitizing and refilling a potable water system onboard a transport vehicle.

BACKGROUND OF THE INVENTION

Potable (drinking) water is commonly found in large commercial transport vehicles such as aircraft, railroad passenger cars, buses, boats and ships. Such water is placed on board these transport vehicles for use as drinking water, making ice cubes, culinary, cleaning and other sanitary purposes. Care must be taken to assure that harmful bacteria and organisms are not present and/or multiplying in the water found inside the potable water storage and distribution systems in these conveyances. Some organisms can live and multiply very rapidly under certain conditions. Most frequently cited to be of concern are coliform, *E. coli*, and *legionella*, but other common bacteria in domestic water supplies in the United States, Canada, and other countries include, but are not limited to, *salmonella typhia, shingella sonnei, dysenteria, flexneri, boydii, vibro cholerae, campylobacter jejuni, yersinia enterocolitica, plesiomonas shigellojodes*, and *aeromonas hydrophila*. Therefore, care is needed in the treatment and handling of water intended for such uses.

Within the United States, the Environmental Protection Agency has a responsibility for regulatory enforcement of the Safe Water Drinking Act of 1974. The Act covers, among other things, municipal drinking water supplies and other water supplies being used by the public. Other politically stable and economically developed countries have similar agencies with similar responsibilities. It is recognized by these agencies that it is economically impossible to provide absolutely pure water. There are, however, achievable, appropriate, and economical limits to the concentration of chemical, mineral, and organic contaminants. These contaminant concentrations are very low and generally do not represent a health threat to the general population.

Most of the watering points used to transfer water into the transport are filled using municipal, and otherwise regulated, treated public water supplies. Acceptably low concentrations of some offensive organisms are routinely introduced into watering points and consequently could find their way into the transport's potable water storage tank(s). Given the right conditions, these offensive organisms can grow and multiply and develop higher concentrations that can be harmful to otherwise strong and healthy people. These organisms can also form biofilms within watering points and a transport's potable water storage tank(s). Such biofilms can re-contaminate watering points and the transport's potable water storage tank(s) even after they have been emptied, flushed, and refilled.

While the cleaning system can be used in a variety of transports, the operating descriptions that follow will use transport aircraft for simplicity. Currently transport aircraft potable water systems are cleaned by following the guidelines established by the EPA. These guidelines have been adopted by large transport aircraft manufacturers. The cleaning procedures are incorporated in each individual aircraft's maintenance service bulletins and are typically accomplished as follows:

1. General
   A. The passenger water system may be disinfected with an application of the following solutions and times:
      i) 50 parts per million of chlorine acidified with vinegar,
      ii) 100 parts per million of chlorine—not acidified, and
      iii) 50 parts per million of chlorine—not acidified.
         Note: Disinfecting time for A.i. and A.ii. is one hour. Disinfecting time for A.iii. is four hours.
   B. Recommended chlorine solution (concentrated). The following will result in a concentrated solution of 50 parts per million of acidified chlorine when added to a 40-gallon water tank. This concentrated solution minimizes the objectionable taste normally attributed to disinfectants and requires the shorter disinfecting time.
      i) 12 fluid ounces (354 ml) chlorine dioxide stabilized 2%.
      ii) 12 fluid ounces (354 ml) acetic acid (vinegar), and
      iii) Approximately 1 gallon (4 liters) clean water.
         Note: Let mixture stand 5 minutes to complete activation.
2. Remove all filter cartridges (if so equipped) from water system, including coffeemakers, where applicable. Ensure filter caps are replaced.
   Note: An excessive amount of disinfectant in the passenger water system may contaminate the filters and give an objectionable taste of chlorinated water. Use of the recommended chlorine solution (Ref. par. 1.B.) will minimize the objectionable taste.
3. Fill the system with chlorinated water which contains 50 or 100 parts per million of chlorine.
   A. The water may be chlorinated in any of the following ways:
      i) A concentrated chlorine solution may be introduced first and then the system filled with drinkable water.
      ii) The concentrated chlorine solution may be mixed with the drinkable water first; then pumped into the system.
      iii) The concentrated solution may be added while the system is being filled.
4. After the system is filled with chlorinated water and chlorinated water has appeared at the overflow port, close the fill and overflow valve.
5. Pressurize the system and open each faucet, drinking fountain (if so equipped) and galley station until chlorinated water appears at each.
6. On airplanes with turn-to-flow faucets:
   A. Close lavatory shutoff valves and open drain vent valves.
   B. Open lavatory faucets and drinking fountains to allow water to flow through vent lines.
7. Depressurize the system, open fill and overflow valve slowly, refill the tank with chlorinated water and close the fill and overflow valve.
8. Let chlorinated water stand in system for 1 hour if filled with 50 parts per million of acidified chlorine or 100 parts per million of chlorine (not acidified) solution. Let chlorinated water stand for 4 hours if filled with 50 parts per million of chlorine (not acidified).

9. Open tank drain valve, vent valves (airplanes with turn-to-flow faucets), lavatory drain valves and lavatory shutoff valves.

10. When water stops flowing from drain outlets, close drain valves and vent valves (airplanes with turn-to-flow faucets).

11. Refill tank with drinkable water and pressurize system.

12. Open each faucet, drinking fountain (if so equipped) and galley station.

13. On airplanes with turn-to-flow faucets, repeat steps in 6 and then open lavatory shutoff valves.

14. Continue to flush system with drinkable water until chlorine content is not objectionable.

15. Install new filter cartridges (if so equipped) and coffeemaker if applicable.

SUMMARY OF THE INVENTION

The system and method for sanitizing and refilling a potable water system onboard a transport vehicle disclosed herein is an alternate means for sanitizing transport potable water systems that eliminates the need to mix, use, and dispose of hazardous chemicals. The cleaning system uses ozone in water at concentrations up to a maximum of 4.0 mg/l in drinking water (4 parts per million) which is cited by the EPA as being safe. It has been reported that concentrations of chlorine of around 5 parts per million can cause respiratory complaints, corrosion of the teeth, inflammation of the mucous membrane of the nose, and increased susceptibility to tuberculosis. Ozone has been cited as safe by the EPA and studies show that ozone has over 3,000 times the disinfecting power of chlorine. At present, no pathogen is believed to be able to survive at $1.5$ mg/$0^3$/l for 5 minutes at reasonable drinking water pH and temperatures.

The system for sanitizing and refilling a potable water system onboard a transport vehicle includes a supply conduit, a feed conduit, a return conduit, and a drain conduit. The supply conduit extends from a potable water source, i.e., a public water source, to a potable water sanitizing and refilling station. The feed conduit extends from the sanitizing and refilling station to the transport's potable water system. The return conduit extends from the transport's potable water system to the sanitizing and refilling station. The drain conduit is in fluid communication with the return conduit. The sanitizing and refilling station also includes a pump operable for selectively causing water to pass through the sanitizing and refilling station and also to pass to and from the transport's potable water system.

The system is operable in a self-flush mode, a sanitizing mode, and a fill mode, and they occur in conjunction with certain drain procedures performed by maintenance personnel on the transport's potable water system. In the self-flush mode, the system is operable for a preselected or preset time following activation to purge stagnant water from the sanitizing and refilling station. In the sanitizing mode, the system is operable for a time which is sufficient to achieve sanitization of the transport's potable water system that has been drained of stagnant water. In the fill mode, the system is operable for a time sufficient to substantially refill the transport's potable water system with water from the public water supply after it has been drained following the sanitizing mode. The return and drain hoses of the system can be used to facilitate the drain procedures on the transport vehicle's potable water system. As a result, the system cycles through its modes in conjunction with the drain procedures performed on the transport's potable water system to accomplish sanitizing and refilling of the transport's potable water system.

The method of sanitizing and refilling a potable water system onboard a transport vehicle includes the step of purging stagnant water from a sanitizing and refilling station by passing water from a public water supply through the station to a drain. It also includes the step of draining stagnant water from the transport's potable water system by draining it to a drain using the transport manufacturer's recommended procedures. It further includes the step of sanitizing the potable water system onboard the transport vehicle by filling it with ozone-injected water and then causing ozone-injected water to pass through the transport's potable water system. It additionally includes the step of draining the transport's potable water system after it has been sanitized and ozone-injected water is no longer being passed through the transport's potable water system. Finally, the method includes the step of filling the water system onboard the transport vehicle by causing water from the public water supply to be delivered by the sanitizing and refilling station to the transport's potable water system.

BRIEF DESCRIPTION OF THE DRAWINGS

FIG. 3 is a schematic view of a portable hose reel cart containing a second portion of a system for sanitizing and refilling a transport's potable water system.

DETAILED DESCRIPTION OF THE PREFERRED EMBODIMENTS

Figure 1:
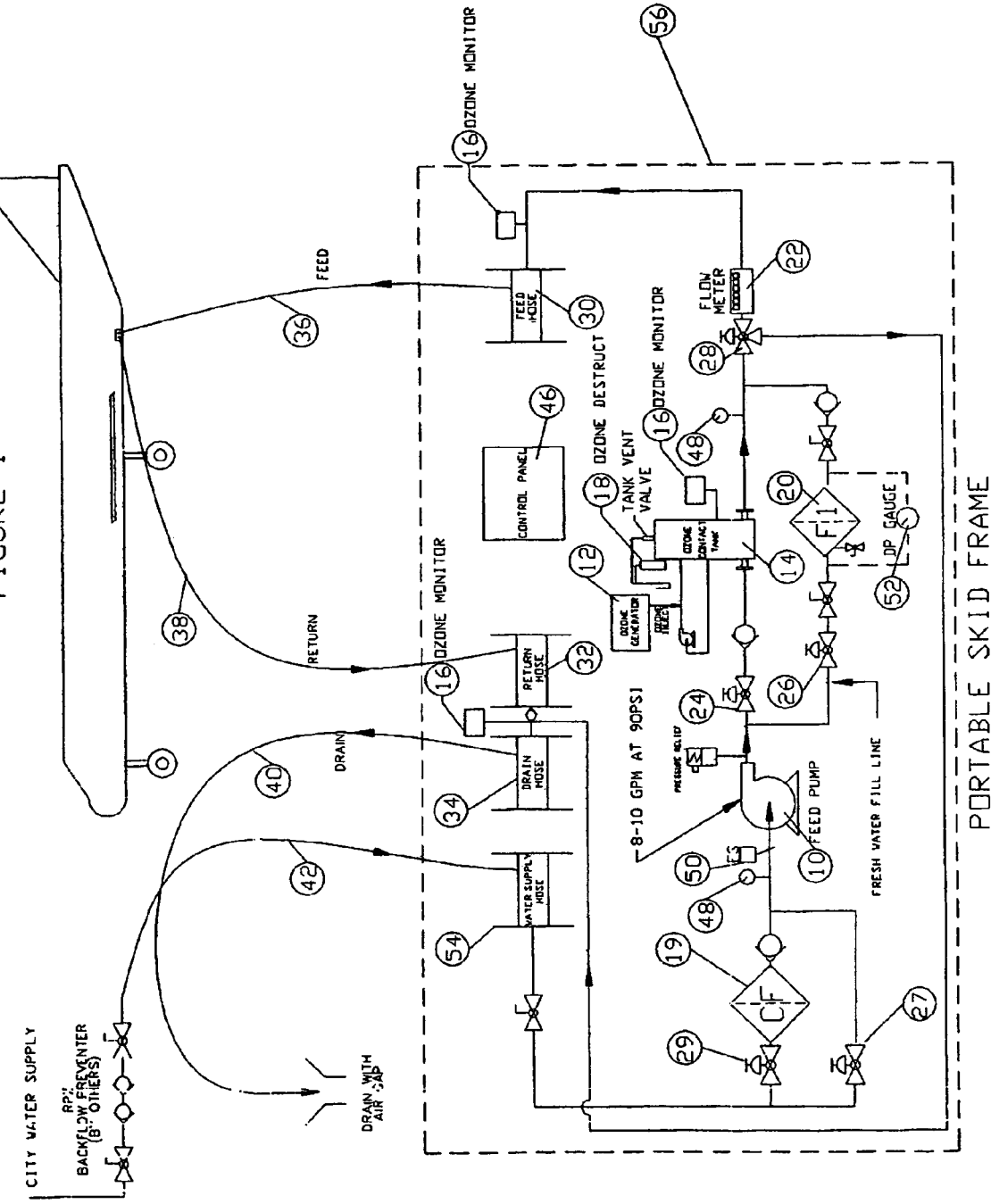
FIG. 1 is a schematic view of a complete portable system for sanitizing and refilling a potable water system onboard a transport vehicle in accordance with the present invention.

With reference to the accompanying drawings, the sanitizing and refilling system disclosed herein incorporates the following components: an electric motor-driven feed pump 10, an ozone generator and injector 12, an ozone contact tank or mixing tower 14, a plurality of ozone monitors 16, an ozone destructor 18, a carbon filter 19 to strip chlorine from the public water supply, a particulate filter 20 appropriately rated for drinking water service, a flow meter 22, automated valves 24, 26, 27, 28 and 29, a feed hose reel 30, a feed conduit or hose 36, a return hose reel 32, a return conduit or hose 38; a drain hose reel 34, a drain conduit or hose 40, a supply hose reel 54, a supply conduit or hose 42, an electrical control panel 46, a plurality of pressure gauges 48, a flow switch 50, and a differential pressure gauge 52.

Figure 2:
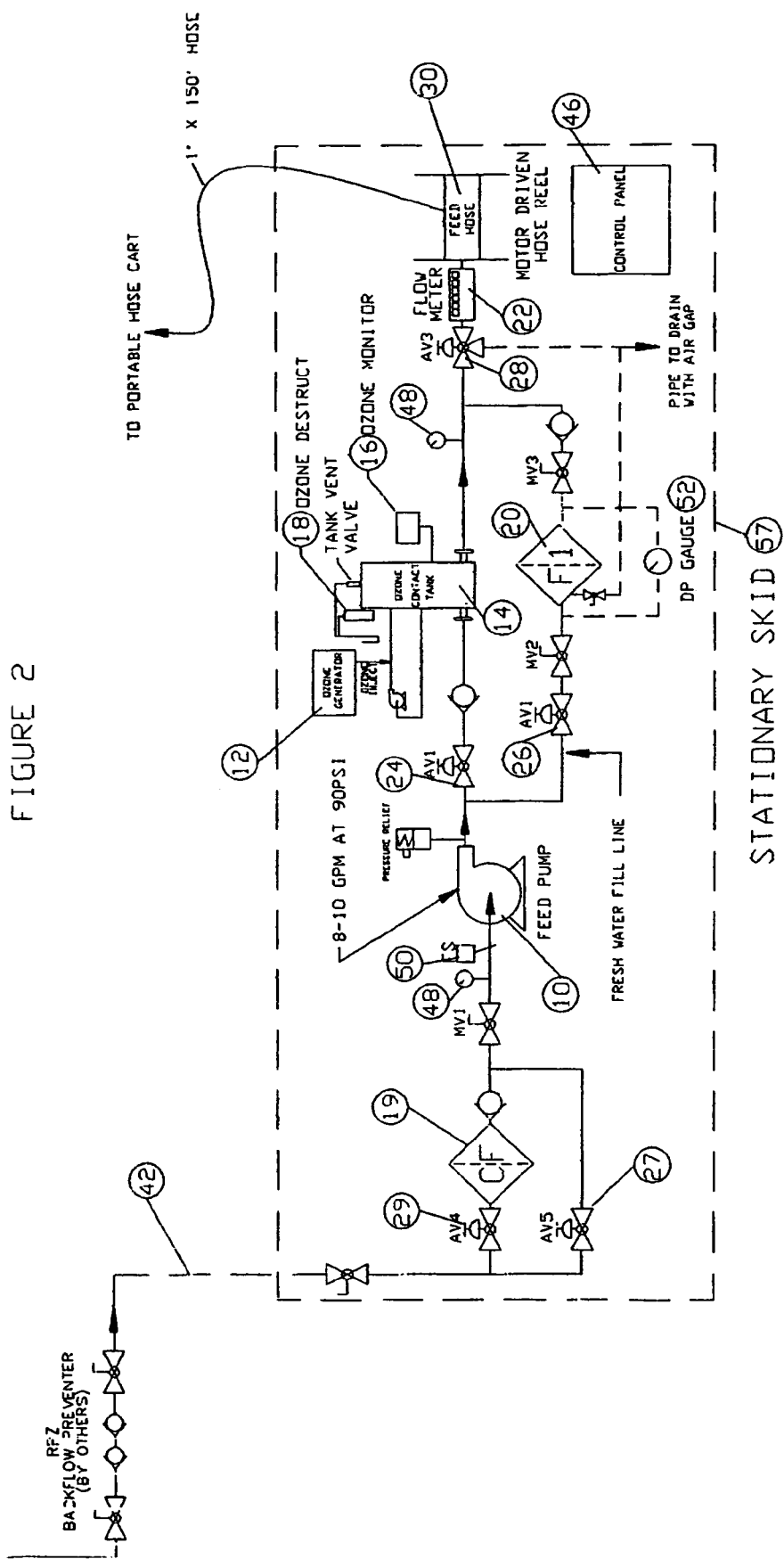
FIG. 2 is a schematic view of a stationary skid frame containing a first portion of a system for sanitizing and refilling a transport's potable water system.

All of the aforementioned components are either mounted on a portable skid frame 56 (as illustrated in FIG. 1) or on a stationary skid 57 (as illustrated in FIG. 2) and a portable hose reel cart 59 (as illustrated in FIG. 3).

Referring to FIG. 1, the system for sanitizing and refilling a potable water system onboard a transport vehicle such as an airplane includes the potable water supply conduit or hose 42, the potable water feed conduit or hose 36, the potable water return conduit or hose 38, and the drain conduit or hose 40. The embodiment of the system illustrated in FIG. 2 may advantageously include a second drain conduit or hose (see "Pipe to Drain with Air Gap") associated with the stationary skid frame 57 to direct water to a drain located at or near the stationary skid frame for purging stagnant water during a self-flush mode. The supply conduit or hose 42 extends from a public water supply to a potable water sanitizing and refilling station (which comprises all of the components shown in the embodiment illustrated in FIG. 2 and comprises all of the corresponding components in the embodiment illustrated in FIG. 1). The feed conduit or hose 36 extends from the portable skid frame 56 to provide fluid communication between the sanitizing and refilling station and the potable water system onboard the transport vehicle. The return conduit or hose 38 extends from the potable water system onboard the transport vehicle to the portable skid frame 56 where it is in fluid communication with the drain conduit or hose 40. The drain conduit or hose 40 extends from the portable skid frame 56 to a drain with air gap which can be associated with a sanitary sewer or storm sewer. As shown, the electric motor-driven feed pump 10 is selectively operable for causing water to pass through the sanitizing and refilling station and to pass to and through the potable water system onboard the transport vehicle.

The system is operable in various modes including a self-flush mode, a sanitizing mode, and a fill mode. In the self-flush mode, the system is operable for a preselected or preset time following activation to purge stagnant water from the sanitizing and refilling station. In the sanitizing mode, the system is operable for a time which is sufficient to achieve sanitization of the transport's potable water system that has been previously drained of stagnant water. In the fill mode, the system is operable for a time sufficient to substantially refill the transport's potable water system with water from the public water supply after it that has been drained following the sanitizing mode. The return and drain hoses 38 and 40 of the system can be used to facilitate the drain procedures on the transport vehicle's potable water system. As a result, the system cycles through its modes in conjunction with the drain procedures performed on the transport's potable water system to accomplish sanitizing and refilling of the transport's potable water system.

From FIG. 1, it will be seen and appreciated that the drain conduit or hose 40 has a discharge end represented schematically by the arrow which is adapted to be positioned over a drain such that there is an air gap between the discharge end of the drain conduit or hose 40 and the drain.

In the self-flush mode, the pump 10 is activated to cause water from the potable water supply source, i.e., the public water supply, to pass through the sanitizing and refilling station and into the drain conduit or hose 40 for discharge into the drain in the embodiment illustrated in FIG. 1 or into the "Pipe to Drain with Air Gap" for discharge into the drain in the embodiment illustrated in FIG. 2. The control panel 46 includes a controller to cause the system to automatically operate in the self-flush mode for a preselected or preset time upon activation of the system. In the sanitizing mode, the pump 10 delivers water from the public water supply to the sanitizing and refilling station where it is injected with ozone by the ozone generator and injector 12. The pump 10 also causes the ozone-injected water from the sanitizing and refilling station to pass through the feed conduit or hose 36 to first fill the transport's potable water system with ozone-injected water and then to cause ozone-injected water to pass through it and through the return conduit or hose 38 and the drain conduit or hose 40. As alternatives, the controller within the control panel 46 causes the system to automatically operate in the sanitizing mode either for a preselected or preset time or until the ozone concentrations in water entering and leaving the transport vehicle are approximately equal.

In the fill mode, the pump 10 is once again activated to cause water from the public water supply to pass through the sanitizing and refilling station while bypassing the carbon filter 19. The carbon filter 19 is bypassed to ensure retention of the residual chlorine in potable water from the public water supply being placed onboard the transport, and bypass is achieved as a result of the controller in the control panel 46 opening and closing the appropriate valves. The pump 10 causes the water from the public water supply to pass through the particulate filter 20 which is appropriately rated for drinking water service and then into the feed conduit or hose 36 for a time sufficient to substantially refill the transport's potable water system.

Referring to FIGS. 2 and 3, another embodiment of the system for sanitizing and refilling a potable water system onboard a transport vehicle is disclosed. It will be appreciated that like reference numbers are applied to elements common to both embodiments, i.e., the embodiment illustrated in FIG. 1 and the embodiment illustrated in FIGS. 2 and 3. However, the latter embodiment differs from FIG. 1 by using a stationary skid 57 (FIG. 2) to be placed in a permanent location and a portable hose reel cart 59 (FIG. 3).

In this connection, it will be appreciated that the term "system" has reference to the entirety of the portable skid 56 including its integral hose reels and associated hoses in the embodiment of FIG. 1, and it has reference to the combined stationary skid 57 and portable hose reel cart 59 and associated hoses in the embodiment illustrated in FIGS. 2 and 3.

Referring to FIG. 3, the portable hose reel cart 59 includes a separate hose reel for the feed hose 36, the return hose 38, and the drain hose 40. Referring to both of FIGS. 2 and 3, a separate feed hose extends from the stationary skid 57 to the portable hose reel cart 59 in fluid communication with the feed hose 36. Thus, the stationary skid 57 can house all of the components at a permanent location except for the hoses and reels on the portable cart 59.

As for other components on both of the embodiments disclosed in FIG. 1 and FIGS. 2 and 3, the sanitizing and refilling station can include the mixing tower 14 through which the pump 10 causes water to pass and into which the ozone generator and injector 12 causes ozone to be injected into the water. It will also be seen that both embodiments can include an ozone monitor 16 for determining when the ozone concentration in the mixing tower 14 exceeds a selected level and an ozone destructor 18 associated with the mixing tower 14 for destroying ozone until the concentration returns to the selected level. As shown in FIG. 1, but also applicable to FIG. 2, the systems can include additional ozone monitors 16 located for determining when the ozone concentration in the water passing through the feed hose 36 to the transport and through the return hose 38 from the transport are approximately equal.

When the ozone concentrations are approximately equal in the water entering and leaving the transport vehicle, or in some cases when the system has been operated in the sanitizing mode for a preselected or preset time, it will be an indication that all of the organisms in the potable water system onboard the transport vehicle have been successfully deactivated and the transport's potable water system is sanitized and ready for refilling.

A general description of the operation of the system for sanitizing and refilling a potable water system onboard a transport vehicle is as follows:

1. After the operator makes the proper connections of the potable water supply hose 42, the potable water feed hose 36, the potable water return hose 38, and the drain hose 40, the system is activated by depressing a push button on the control panel 46 of the sanitizing and refilling station, whether the control panel 46 is a part of a portable skid 56 as illustrated in FIG. 1 or is a part of a stationary skid 57 as illustrated in FIG. 2.

2. The system is activated beginning with the self-flush mode which operates for a preselected or preset time to purge all stagnant water in advance of sanitizing the potable water system of the transport vehicle. Automated valve 28 diverts flow to the drain hose 40 while automated valves 24 and 26 are opened to cause stagnant water to be flushed out of the system by water from the public water supply. The water from the public water supply also flushes the mixing tower 14, the carbon filter 19, and the particulate filter 20 at the same time to thereby effectively flush the entire system.

3. Any stagnant water remaining in the transport's potable water system is drained by maintenance personnel. Draining can be facilitated by using the return hose 38 which is connected to the transport vehicle's service panel and the drain hose 40 which is in fluid communication with the return hose 38, to thereby drain the water in the transport's potable water system to a drain with air gap following the transport manufacturer's recommended procedures.

4. The sanitizing mode is started after the self-flush mode has timed out and the transport's potable water system has been drained of stagnant water. In the sanitizing mode, the system uses the public water supply into which ozone is injected in a range between 0.1 and 4.0 mg/l[PPM] (typically 1.5 mg/l [PPM]). The sanitizing mode can either begin immediately following the self-flush mode or can be initiated by having maintenance personnel depress a push button at the control panel 46 that controls the sanitizing mode and/or the subsequent fill mode. This ozonated water is fed into the potable water system of the transport vehicle by the pump 10 which pumps it through the feed hose 36 which is in fluid communication with the mixing tower 14. The ozone concentration in the water being fed into the transport's potable water system can be regulated using the ozone monitor 16 connected to the mixing tower 14. The ozonated water travels through the feed hose 36 into and through the transport's potable water system and then through the return hose 38 connected to the transport's service panel drain connection. The ozonated water then flows through the drain hose 40 which has a discharge end placed over the drain with air gap where it is discharged into the drain as waste water. Alternatively, the water flowing through the return hose 38 can recirculate through the sanitizing and refilling station by providing a diverter valve between the return hose 38 and the drain hose 40. The diverter valve can be set to permit water flowing through the return hose 38 to either pass into the drain hose 40 or to be recirculated through the sanitizing and refilling station. The ozone level of the water returning from the transport's potable water system through the return hose 38 can be measured in either case by another ozone monitor 16 at a point downstream of the return hose 38. The sanitizing mode can continue for a preselected or preset time determined by the transport's potable water system capacity, or until the ozone levels of water entering and leaving it are approximately equal. Further, if desired, the ozone level of the water entering the transport's potable water system can be compared with the ozone level at all exit points, i.e., faucets, outlets, vents, and over-flow drains to confirm adequate disinfection. The sanitizing mode is complete either after the preselected or preset time of operation or once the ozone levels at all or selected exit points are approximately equal to the ozone level of water entering the transport's potable water system.

5. The transport's potable water system is drained of the sanitizing water immediately after the sanitizing mode has been completed. While the sanitizing water used during the sanitizing mode is being drained by maintenance personnel, the system is not running. However, the return hose 38 can remain connected to the transport vehicle's service panel and the drain operation performed by opening manual drain and vent valves at the service panel. The drain operation will be understood to vary by the different types and models of transport vehicle, e.g., aircraft such as that shown in FIG. 1

6. Once all of the water has been manually drained from the transport vehicle, the maintenance personnel selects the fill mode by depressing the push button at the control panel 46. The system will then begin to refill the potable water system onboard the transport vehicle with fresh potable water being delivered from the public water supply through the sanitizing and refilling station. The system automatically closes the valve 24 and opens the valve 26 to bypass the mixing tower 14 and the carbon filter 19, and the potable water passes through a particulate filter 20. The pump 10 pumps the water from the public water supply through the feed hose 36 and into the potable water system of the transport vehicle until it is substantially full and air has been purged from the distribution lines.

7. The operator then turns the system off at the control panel 46, the feed hose 36 and the return hose 38 are uncoupled from the transport vehicle's service panel, and the supply hose 42 is uncoupled from the public water supply, following which the hoses 36, 38, 40 and 42 are stowed on the respective hose reels 30, 32, 34, and 54.

The present invention thus eliminates the need to use hazardous chemicals (chlorine), the safety equipment associated with hazardous chemicals, and the need to dispose of hazardous waste. Since ozone is a radical $O^3$ molecule and is inherently unstable it will return to its natural state (an ordinary oxygen molecule) in a short time depending on temperature and other factors. Thus, there is an absence of any residual waste chemicals. Furthermore, since ozone's bacterial kill rate is over 3,000 times faster than chlorine, the cleaning time required for each transport vehicle is significantly reduced. Since most municipal water supplies have residual chlorine to prevent bacterial regrowth, there is no need to insert additional chemicals in the transport's potable water system.

In the foregoing specification, a detailed description of the present invention has been set forth although it will be appreciated by those skilled in the art that the details herein given may be varied without departing from the true spirit and scope of the appended claims.

What is claimed is:

1. A system for sanitizing and refilling a potable water system onboard a transport vehicle, comprising:
   a potable water supply conduit extending from a public water supply to a potable water sanitizing and refilling station;
   a potable water feed conduit extending from the sanitizing and refilling station to the transport's potable water system;
   a potable water return conduit extending from the transport's potable water system to the sanitizing and refilling station;
   a drain conduit in fluid communication with the sanitizing and refilling station and the return conduit, respectively;
   the sanitizing and refilling station including a pump operable for selectively causing water to pass through the sanitizing and refilling station, and also causing water to pass to and from the potable water system onboard the transport vehicle through the feed conduit and the return conduit; and the sanitizing and refilling station also including an ozone generator and injector for selectively injecting ozone into water passing through the sanitizing and refilling station and water passing to and from the transport's potable water system through the feed conduit and the return conduit;

the system being operable in a self-flush mode, a sanitizing mode, and a fill mode, wherein:

in the self-flush mode the system operates for a preselected or preset time to purge stagnant water from the sanitizing and refilling station;

in the sanitizing mode the system operates for a time sufficient to achieve sanitization of the transport's potable water system; and in the fill mode the system operates for a time sufficient to substantially refill the transport's potable water system.

2. The system of claim 1, wherein the drain conduit has a discharge end adapted to be positioned over a drain such that there is an air gap between the discharge end of the drain conduit and the drain.

3. The system of claim 1, wherein in the self-flush mode the pump causes water from the public water supply to pass through the sanitizing and refilling station to cause stagnant water to be purged through the drain conduit and discharged into a drain.

4. The system of claim 3, wherein a controller causes the system to automatically operate in the self-flush mode for a preselected or preset time upon activation of the system to purge stagnant water from the sanitizing and refilling station.

5. The system of claim 1, wherein in the sanitizing mode the ozone generator and injector injects water with ozone and the pump causes the ozone-injected water to pass through the feed conduit into the transport's potable water system.

6. The system of claim 5, wherein a controller causes the system to operate in the sanitizing mode for a preselected or preset time or until ozone levels in water entering and leaving the transport's potable water system are approximately equal.

7. The system of claim 1, wherein in the fill mode the pump causes water from the public water supply to pass through the sanitizing and refilling station and through the feed conduit to substantially refill the transport's potable water system.

8. A system for sanitizing and refilling a potable water system onboard a transport vehicle, comprising:

a potable water supply conduit extending from a public water supply to a potable water sanitizing and refilling station;

a potable water feed conduit extending from the sanitizing and refilling station to the transport's potable water system;

a potable water return conduit extending from the transport's potable water system to the sanitizing and refilling station;

a drain conduit in fluid communication with the sanitizing and refilling station and the return conduit, respectively;

the sanitizing and refilling station including a pump operable for selectively causing water to pass through the sanitizing and refilling station, and also causing water to selectively pass to and from the transport's potable water system through the feed conduit and the return conduit; and the sanitizing and refilling station also including an ozone generator and injector for selectively injecting ozone into water passing through the transport's potable water system and to and from the transport's potable water system through the feed conduit and the return conduit;

the system being operable in a self-flush mode, a sanitizing mode, and a fill mode, wherein:

in the self-flush mode the system operates for a preselected or preset time following activation to purge stagnant water from the sanitizing and refilling station, the pump causing water from the public water supply to pass through the sanitizing and refilling station to cause stagnant water to be purged through the drain conduit and discharged into a drain;

in the sanitizing mode the system operates for a time sufficient to achieve sanitization of the transport's potable water system, the ozone generator and injector injecting water with ozone and the pump causing the ozone-injected water to pass through the feed conduit into and through the transport's potable water system; and in the fill mode the system operates for a time sufficient to substantially refill the transport's potable water system, the pump causing water from the public water supply to pass through the sanitizing and refilling station and through the feed conduit to substantially refill the transport's potable water system.

9. The system of claim 8, wherein a controller causes the system to automatically operate in the self-flush mode for a preselected or preset time upon activation of the system to purge stagnant water from the sanitizing and refilling station.

10. The system of claim 8, wherein a controller causes the system to operate in the sanitizing mode for a preselected or preset time or until ozone levels in water entering and leaving the transport's potable water system are approximately equal.

11. The system of claim 8, wherein the drain conduit has a discharge end adapted to be positioned over a drain such that there is an air gap between the discharge end of the drain conduit and the drain.

12. The system of claim 8, further comprising:

a portable skid for the sanitizing and refilling station including the pump and the ozone generator and injector for movement to and from the transport vehicle.

13. The system of claim 8, further comprising:

a stationary skid for the sanitizing and refilling station including the pump and the ozone generator and injector, and a portable hose reel cart associated with the skid.

14. The system of claim 13, wherein the supply conduit, the feed conduit, the return conduit, and the drain conduit each comprise a hose.

15. The system of claim 14, wherein the portable hose reel cart includes a separate hose reel for the feed hose, the return hose and the drain hose.

16. The system of claim 15, including a separate hose extending from the stationary skid to the portable hose reel cart in fluid communication with the feed hose.

17. The system of claim 8, wherein the sanitizing and refilling station includes a mixing tower through which the pump causes water to pass and into which the ozone generator and injector causes ozone to be injected into the water.

18. The system of claim 17, further comprising:
an ozone monitor associated with the feed conduit and an ozone monitor associated with the return conduit for determining when the ozone concentration in the water passing through the feed conduit and through the return conduit to and from the transport's potable water system are approximately equal.

19. The system of claim 17, further comprising:
an ozone monitor for determining when the ozone concentration in the mixing tower exceeds a selected level and an ozone destructor associated with the mixing tower for destroying ozone until the ozone concentration returns to the selected level.

* * * * *